United States Patent
Suzuki

[11] Patent Number: 6,124,990
[45] Date of Patent: Sep. 26, 2000

[54] CLOSE-UP PHOTOGRAPHING LENS

[75] Inventor: Kenzaburo Suzuki, Yokohama, Japan

[73] Assignee: Nikon Corporation, Tokyo, Japan

[21] Appl. No.: 09/192,916

[22] Filed: Nov. 16, 1998

[30] Foreign Application Priority Data

Dec. 19, 1997 [JP] Japan ..................... 9-364318

[51] Int. Cl.$^7$ ................................. G02B 13/04
[52] U.S. Cl. .......................... 359/749; 359/753
[58] Field of Search ..................... 359/693, 768, 359/766, 758, 749–753

[56] References Cited

U.S. PATENT DOCUMENTS

| | | | |
|---|---|---|---|
| 4,178,076 | 12/1979 | Tsuji et al. ........................ | 350/184 |
| 4,621,909 | 11/1986 | Hamanishi ........................ | 350/464 |
| 5,331,465 | 7/1994 | Miyano ........................... | 359/693 |

Primary Examiner—Scott J. Sugarman

Attorney, Agent, or Firm—Vorys, Sater, Seymour and Pease LLP

[57] ABSTRACT

A close-up photographing lens (10) having a long back focus and a large aperture, thus making the lens suitable for use with high-performance electronic imaging equipment. The lens comprises, objectwise to imagewise, a first lens group (G1) having positive refractive power, a second lens group (G2) having positive refractive power, and a relay optical system (GL) having positive refractive power. The relay optical system includes a third lens group (GLN) having negative refractive power and a fourth lens group (GLP) having positive refractive power. The first lens group and the second lens group are separated by an axial air space (D12) and move objectwise on different trajectories (16,18) when changing focus from an infinite focus state to a most close-up focus state. The axial air space is narrower in the most close-up focus state than in the infinite focus state. The lens preferably satisfies at least one of a number of design conditions.

11 Claims, 8 Drawing Sheets

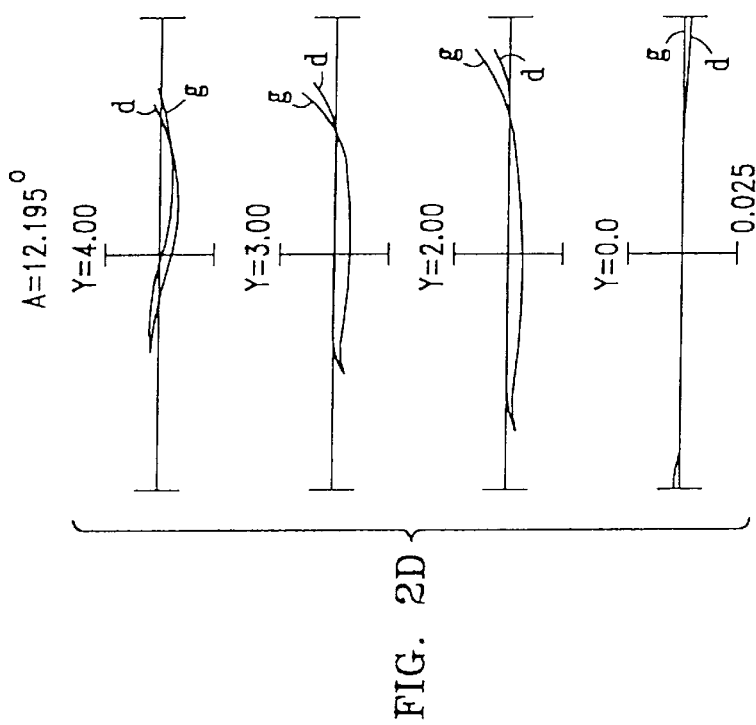
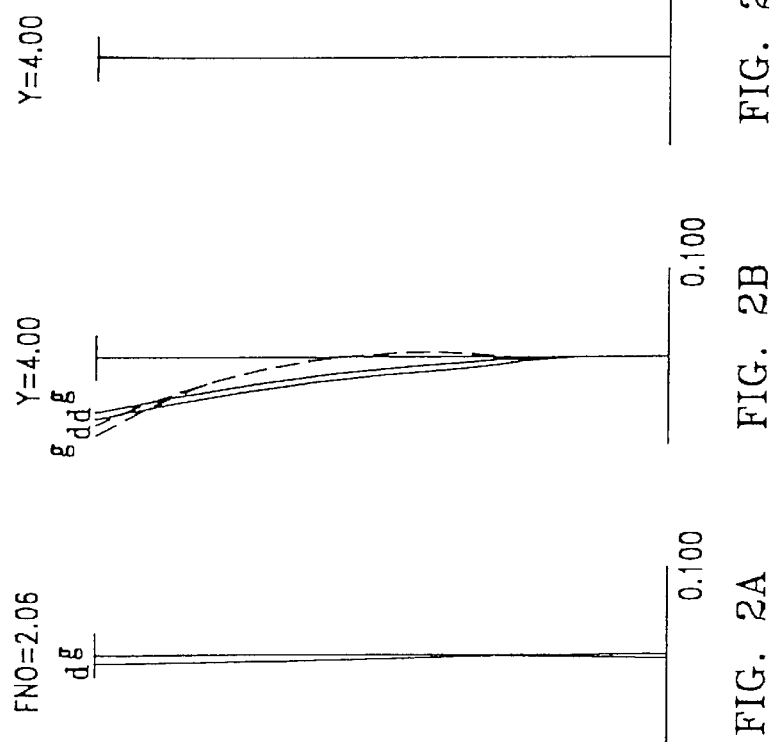
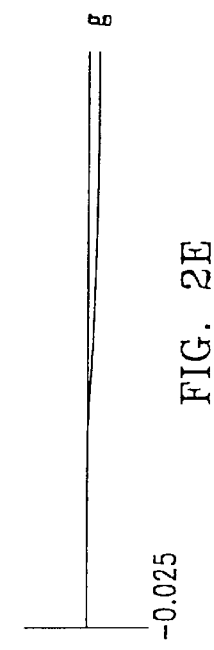
FIG. 2A  FIG. 2B  FIG. 2C  FIG. 2D  FIG. 2E

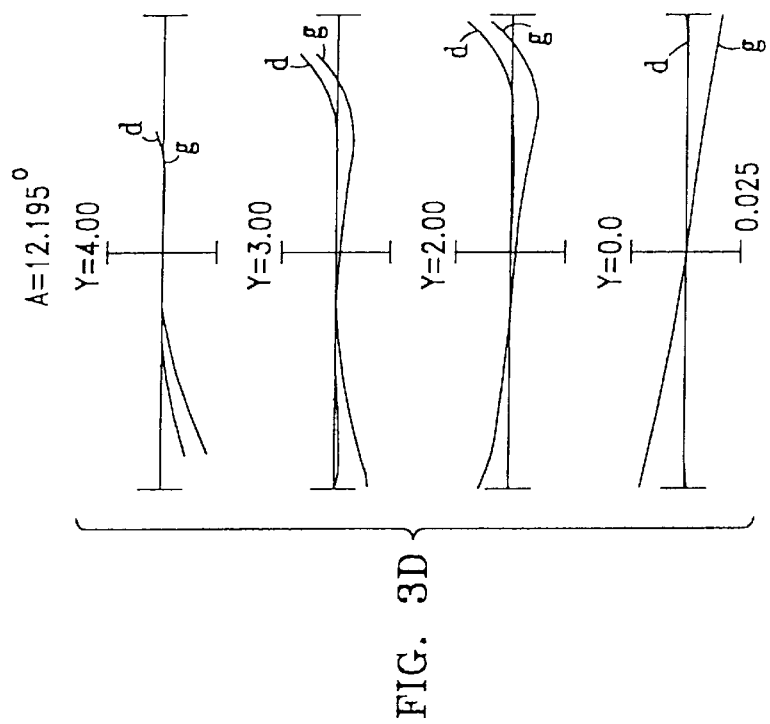
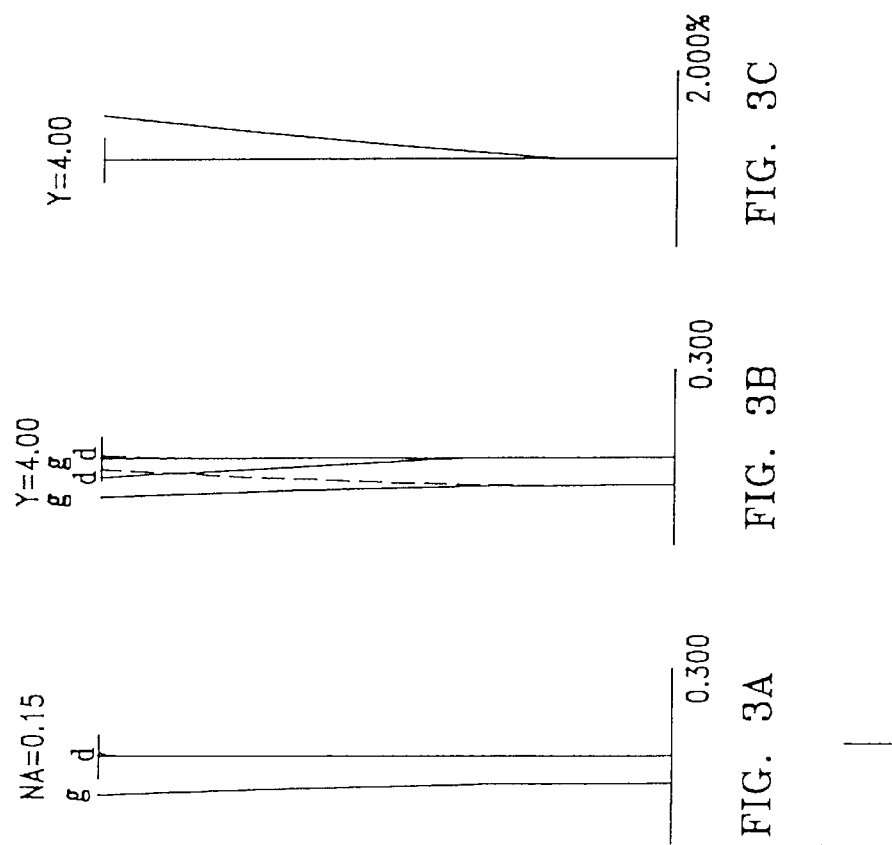
FIG. 3A  FIG. 3B  FIG. 3C  FIG. 3D  FIG. 3E

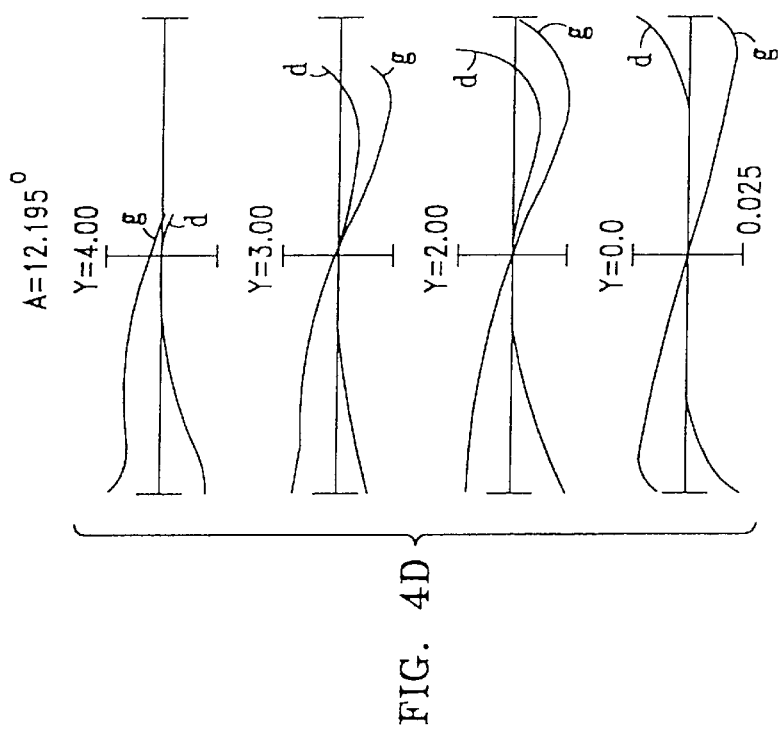
FIG. 4D
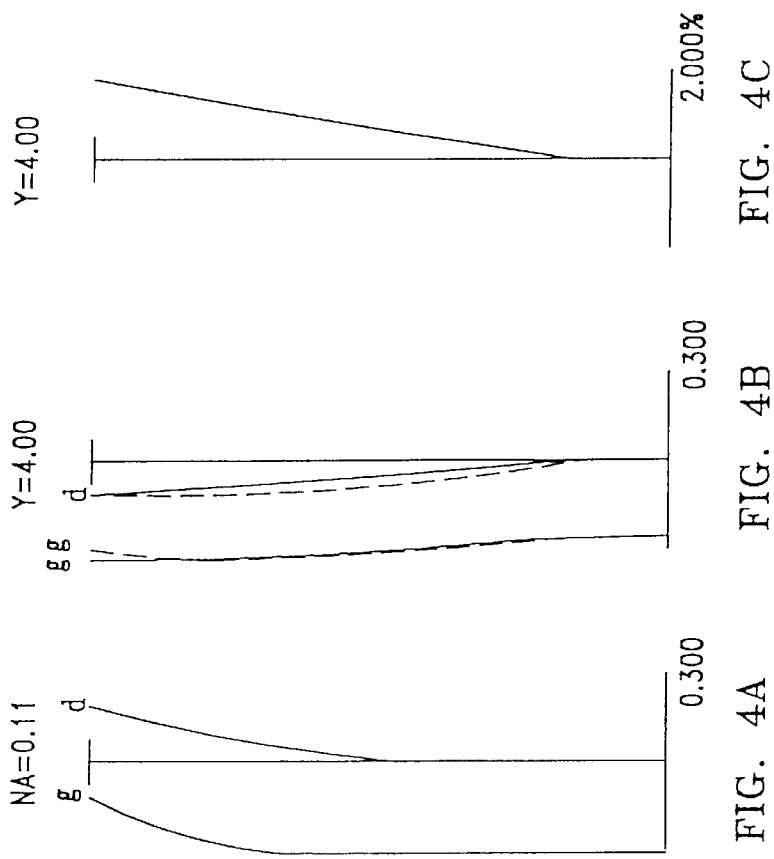
FIG. 4A  FIG. 4B  FIG. 4C
FIG. 4E

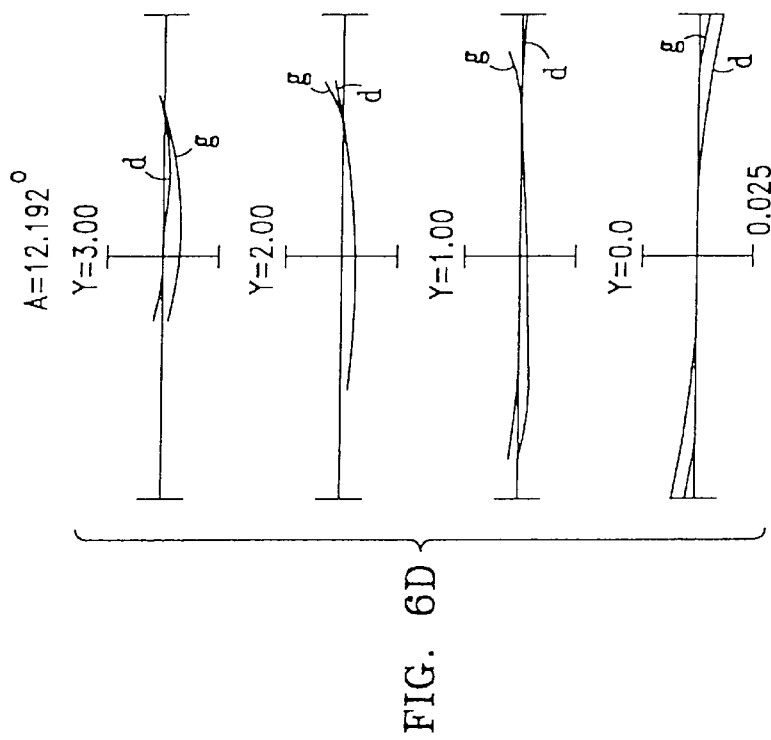
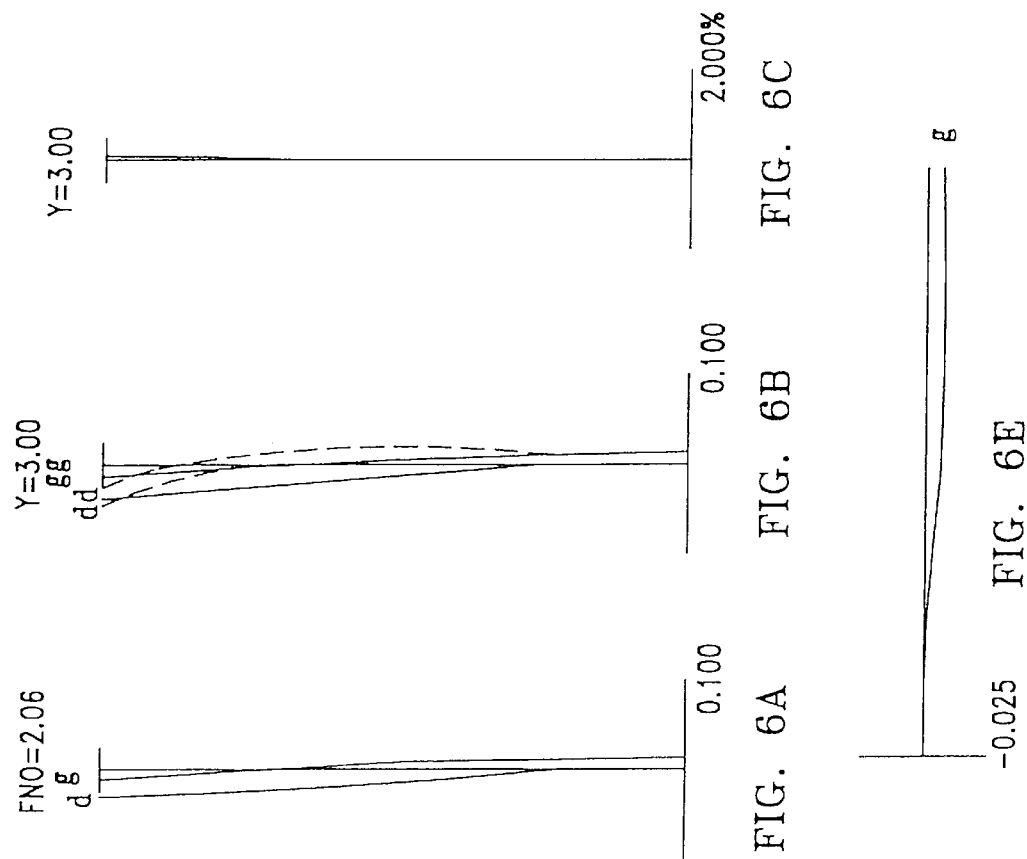

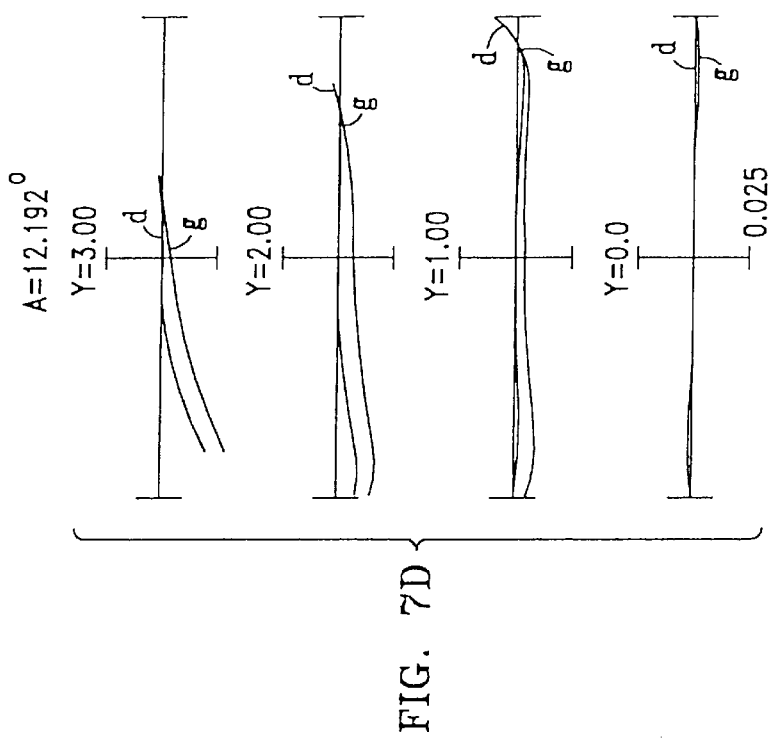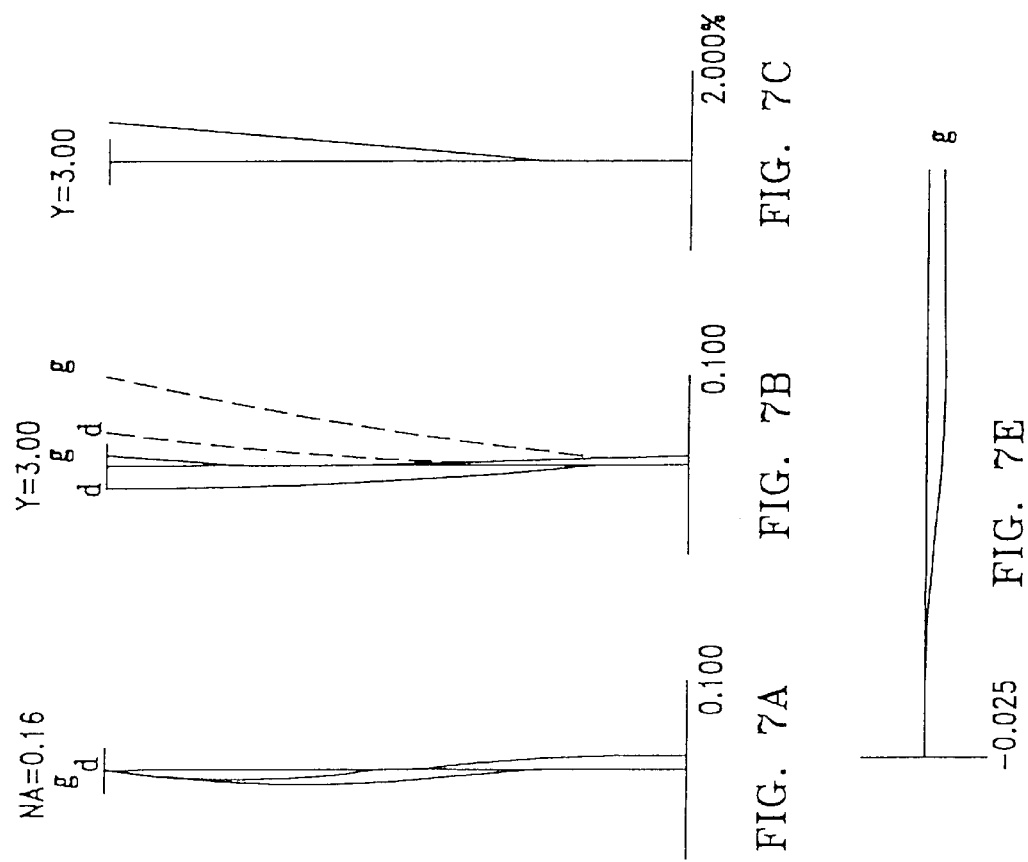

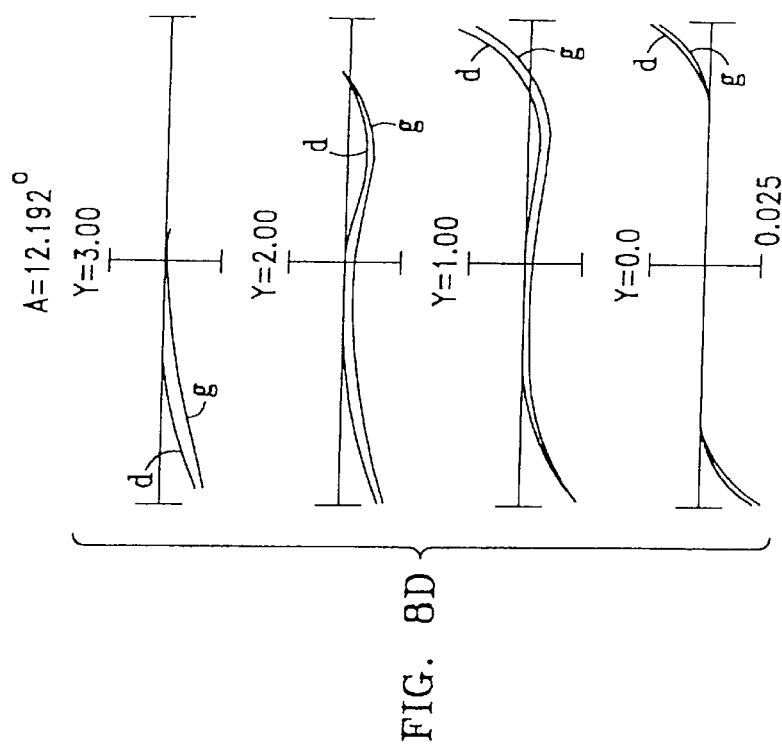
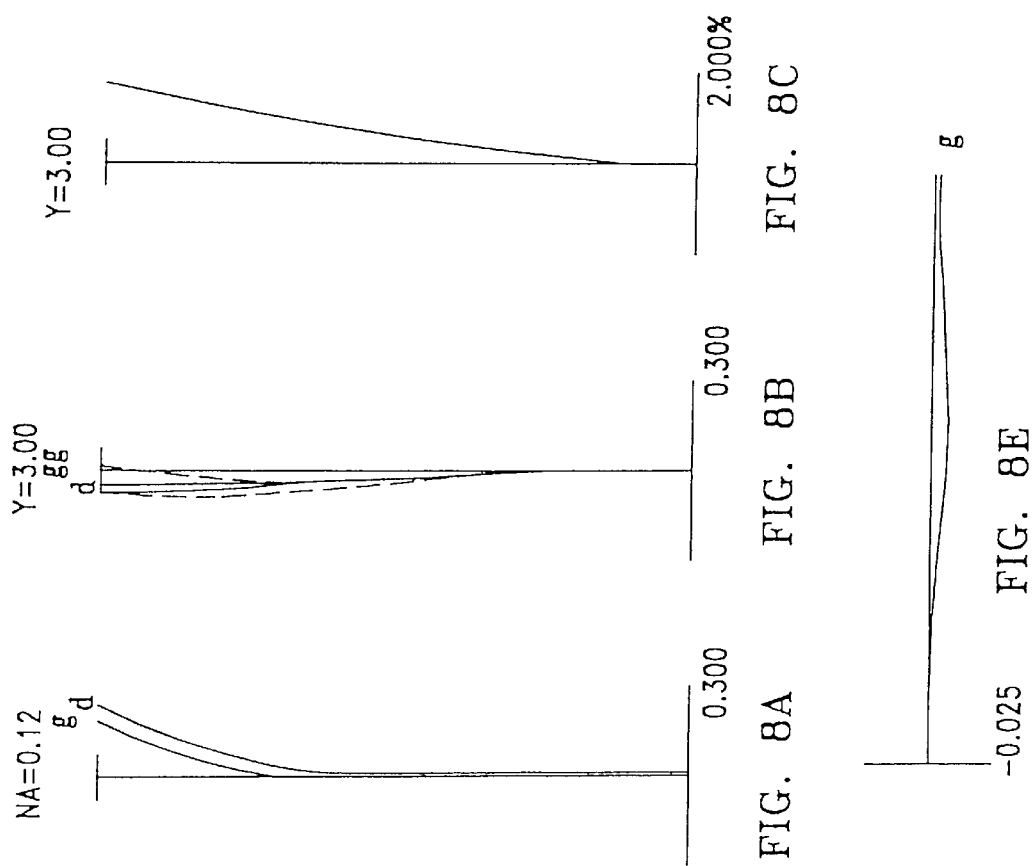

CLOSE-UP PHOTOGRAPHING LENS

FIELD OF THE INVENTION

The present invention relates to close-up photographing lenses, and more particularly relates to such lenses having a long back focus and a large aperture, thus making them suitable for use with high-performance electronic imaging equipment.

BACKGROUND OF THE INVENTION

Conventional close-up photographing lenses are used principally in 35 mm film-based (i.e., silver chloride film) photography. Examples of such lenses are disclosed in Japanese Patent Application Kokai No. Hei 7-1330 and Japanese Patent Application Kokai No. Hei 7-294853.

Nevertheless, conventional close-up photographing lenses, such as those cited above, do not have a sufficiently long back focus for the image height required in high-performance electronic equipment, such as optoelectronic apparatus employing charge-coupled devices (CCDs) and the like as image detectors situated in the image plane. Consequently, the space between the most imagewise lens element and the image plane ends up being too small, making it difficult to accommodate filters, prisms and the like adjacent the image plane. In addition, conventional close-up photographing lenses do not have adequate imagewise telecentricity, resulting in unwanted "shading," making them unsuitable for use with optoelectronic equipment employing CCDs and the like.

SUMMARY OF THE INVENTION

The present invention relates to close-up photographing lenses (i.e., so-called macro-lenses or micro-lenses), and more particularly relates to such lenses having a long back focus and a large aperture, thus making them suitable for use with high-performance electronic imaging equipment.

A first aspect of the invention is a close-up photographing lens capable of forming an image of an object and changing focus from an infinite focus state to a most close-up focus state. The lens comprises, objectwise to imagewise along an optical axis, a first lens group having positive refractive power, a second lens group having positive refractive power and axially separated from the first lens group by an air space D12, and a relay optical system having positive refractive power. The lens is designed such that, when changing focus from the infinite focus state to the most close-up focus state, the first lens group and the second lens group move objectwise on different trajectories, and the air space D12 is narrower in the most close-up focus state than when in the infinite focus state. Further, the following design conditions are satisfied:

$$0.25 < |\beta_{MOD}| \quad (1)$$

$$2.0 < BF/Y < 10.0 \quad (2)$$

$$0.02 < \Delta D12/BF < 3.0 \quad (3)$$

wherein $\beta_{MOD}$ is a photographic magnification in the most close-up focus state, BF is a back focus in the infinite focus state, Y is a maximum height of the image, and $\Delta D12$ is a change in the air space D12 when focusing from the infinite focus state to the most close-up focus state.

A second aspect of the invention is a close-up photographing lens as described above, further satisfying the following condition:

$$1.0 < \Delta 1 \cdot |\beta_{MOD}|/Y < 10.0 \quad (4)$$

wherein $\Delta 1$ is the amount of movement of the first lens group when focusing from the infinite focus state to the most close-up focus state, the sign of $\Delta 1$ being positive when the first lens group moves objectwise.

A third aspect of the invention is a close-up photographing lens as described above, wherein the relay optical system includes a third lens group having negative refractive power and a fourth lens group having positive refractive power. The third and fourth lens groups are axially separated by an air space $d_{NP}$, and the following condition is satisfied:

$$0.1 < d_{NP}/Y < 5.0. \quad (5)$$

A fourth aspect of the invention is a close-up photographing lens as described above, wherein the fourth lens group includes at least one positive lens and at least one negative lens.

A fifth aspect of the invention is a close-up photographing lens as described above, wherein an aperture stop is provided between the first lens group and the second lens group. The fourth lens group also includes at least one cemented lens comprising a positive single lens and a negative single lens, and the following condition is satisfied:

$$\nu_N < 30 \quad (6)$$

wherein $\nu_N$ is a minimum Abbe number for the negative lenses in the lens fourth lens group.

A sixth aspect of the invention is a close-up photographing lens as described above, wherein the second lens group has a most imagewise positive meniscus lens having an imagewise convex surface.

A seventh aspect of the invention is a close-up photographing lens as described above, wherein the first lens group includes a negative meniscus lens having a front surface and a rear surface, with air adjacent the front surface and the rear surface. In addition, the third lens group includes at least one negative lens and at least one positive lens. Further, the fourth lens group includes a cemented lens comprising a positive single lens and a negative single lens and having a divergent convex cemented surface therebetween facing objectwise, and a biconvex lens having a weaker curvature surface and a stronger curvature surface, with the stronger curvature surface arranged objectwise.

BRIEF EXPLANATION OF DRAWINGS

FIGS. 2A–2E are aberration plots for spherical aberration, astigmatism, distortion, coma, and lateral chromatic aberration, respectively, for Working Example 1 in the infinite focus state;

FIGS. 3A–3E are aberration plots for spherical aberration, astigmatism, distortion, coma, and lateral chromatic aberration, respectively, for Working Example 1 in the –½× phototaking state (intermediate magnification state);

FIGS. 4A–4E are aberration plots for spherical aberration, astigmatism, distortion, coma, and lateral chromatic aberration, respectively, for Working Example 1 in the –½× phototaking state (most close-up focus state);

FIGS. 6A–6E are aberration plots for spherical aberration, astigmatism, distortion, coma, and lateral chromatic aberration, respectively, for Working Example 2 in the infinite focus state;

FIGS. 7A–7E are aberration plots for spherical aberration, astigmatism, distortion, coma, and lateral chromatic aberration, respectively, for Working Example 2 in the –½× phototaking state (intermediate magnification state); and FIGS. 8A–8E are aberration plots for spherical aberration, astigmatism, distortion, coma, and lateral chromatic aberration, respectively, for Working Example 2 in the –½× phototaking state (most close-up focus state).

DETAILED DESCRIPTION OF THE INVENTION

The present invention relates to close-up photographing lenses (i.e., so-called macro-lenses or micro-lenses), and more particularly relates to such lenses having a long back focus and a large aperture, making them suitable for use with high-performance electronic imaging equipment.

The close-up photographing lens of the present invention is explained with reference to close-up photographing lens 10 of FIG. 1, which is a Working Example 1 of the present invention, described in greater detail below. Lens 10 comprises, in order along optical axis A from an object (not shown) to image plane 14 (i.e., objectwise to imagewise), a first lens group G1 having positive refractive power, a second lens group G2 having positive refractive power, and a relay optical system GL having positive refractive power. Lens groups G1 and G2 are separated by an axial distance (i.e., an axial air space) D12. Relay optical system GL includes, objectwise to imagewise, a lens group GLN (i.e., a third lens group) having negative refractive power, and a lens group GLP (i.e., a fourth lens group) having positive refractive power.

Close-distance focusing on an object is performed by moving first lens group G1 and second lens group G2 objectwise on differing trajectories, as indicated by arrows 16 and 18, respectively. This focusing is such that axial air space D12 is more narrow when focusing at the shortest phototaking distance (i.e., focusing on a most close-up distance object, or "the most close-up focus state") than when focusing at infinity (i.e. focusing on an infinite-distance object, or "the infinite focus state"). Such a focusing system is called a "floating focus system," and is capable of satisfactorily correcting aberrations. Thus, when changing focus from the infinite focus state to the most close-up focus state, excellent imaging performance can be obtained.

In the present invention, the design of lens 10 is such that, in the intermediate magnification state (i.e., the –½× phototaking state) between the infinite focus state and the most close-up focus state, axial air space D12 is small but may become larger or smaller. Further, in this intermediate photographic magnification state, satisfactory imaging performance is obtained when D12 is set to the same size or slightly larger than when in the infinite focus state. Further, to obtain satisfactory imaging performance, axial air space D12 must be smaller in the most close-up focus state than in the infinite focus state.

Figure 1:
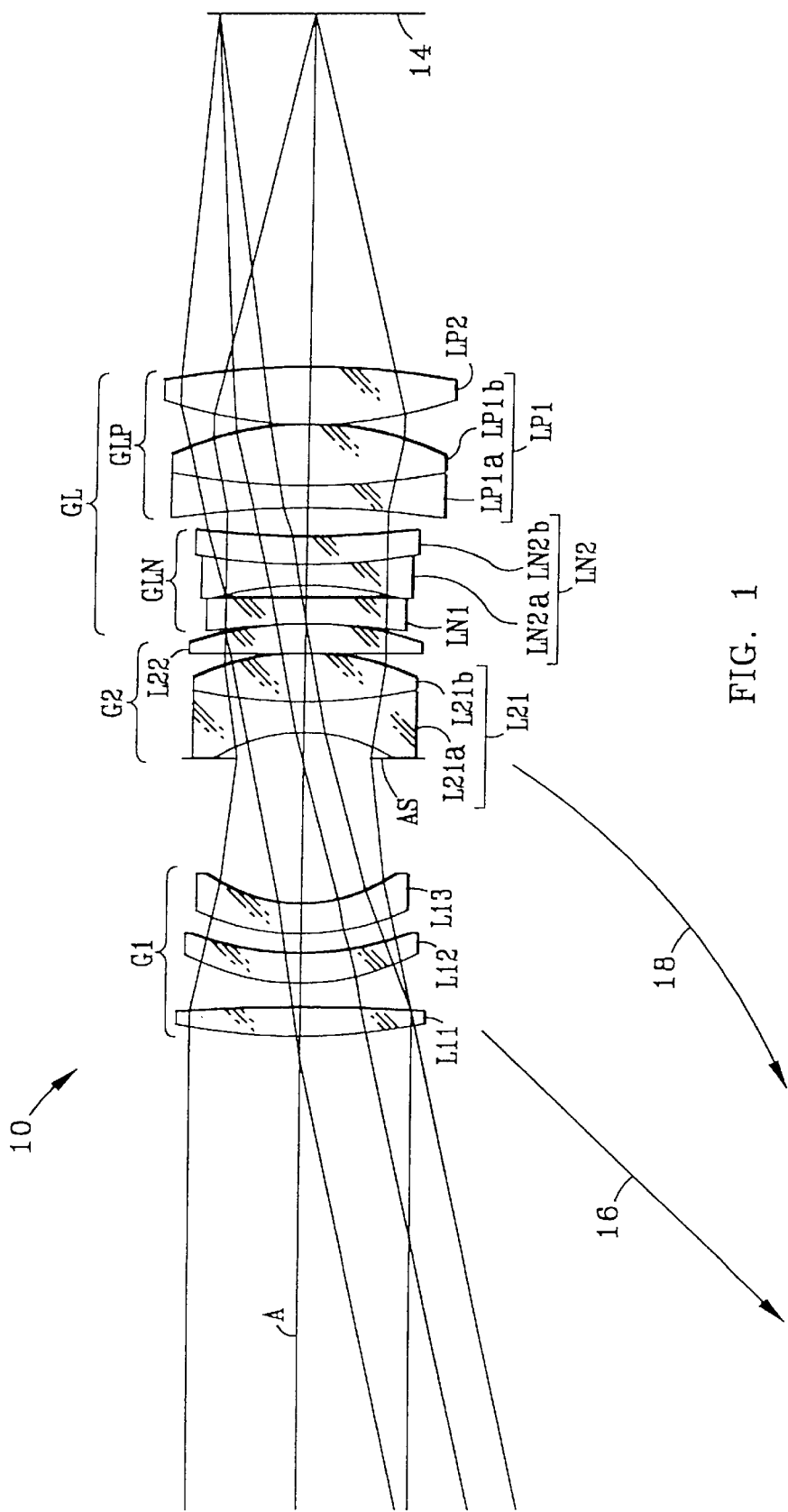
FIG. 1 is a schematic optical diagram of Working Example 1 of the present invention.

With continued reference to FIG. 1, if first lens group G1 and second lens group G2 move in identical trajectories 16 and 18, then there is a tendency for the imaging performance to deteriorate at the intermediate magnification state between the infinite focus state and the most close-up focus state. This tendency becomes more marked as the maximum photographic magnification increases. Further, when changing focus from the infinite focus state to the most close-up focus state, the position of the exit pupil (not shown) of lens 10 changes. The exit pupil position of an optical system generally refers to the position of the image of the aperture stop (in lens 10, for instance, aperture stop AS) due to the portion of the optical system imagewise of the aperture stop.

However, if the exit pupil position is such that it includes the infinite focus state, the lens becomes telecentric and thus ideally suited to optoelectronic equipment having an image detector such as a CCD or the like in the image plane (e.g., image plane 14). This arrangement is also preferable from the viewpoint of correcting aberrations in the close-up photographing lens of the present invention. A telecentric lens is made possible by arranging aperture stop AS between first lens group G1 and second lens group G2, by an appropriately distributing power between the lens groups, and by satisfying a number of design conditions, as discussed in detail below.

Satisfactory imaging performance is obtained from the infinite focus state up through each photographic magnification state, including the –½× (i.e., intermediate) magnification state and unity (–1×) magnification state (i.e., most close-up focus state). In particular, since the overall refractive power of relay optical system GL is positive, a configuration that supports brightness (i.e., a small F-number) becomes possible. An increased aperture size is also possible, since light beams (particularly light beams from an axial object point), can be bent gently, as in a Petzval portrait lens. In the Working Examples of the present invention, set forth below, a lens is obtained having an F-number of approximately F/2.0.

There is much prior art pertaining to single lens reflex cameras with relay optical systems having overall negative refractive power. However, such cameras have a tendency toward a short back focus, and have an exit pupil relatively close to the image plane, so that telecentricity is lacking, making the camera unsuitable for use with high-performance electronic imaging equipment and related applications. Also, the aberration characteristics of these cameras vary greatly.

In attempting to increasing the aperture size of a conventional close-up photographing lens, the Petzval sum of the entire optical system tends to become excessively large and positive.

However, due to the progress in glass manufacturing technology in recent years, the aforementioned problems have been overcome, since the high-refractive-index glass necessary for the positive lenses to correct the Petzval sum has become available.

In the present invention, the overall refractive power of relay optical system GL is positive. This allows the exit pupil position of close-up lens 10 to be distant from the image plane. This, in turn, allows the problem of shading to be avoided and facilitates a telecentric configuration ideally suited to electronic imaging equipment.

With continuing reference to FIG. 1, though the overall refractive power of relay optical system GL is positive, the present invention employs an internal configuration for system GL that includes negative lens group GLN having negative refractive power and positive lens group GLP having a positive refractive power. Between lens groups GLN and GLP is the largest air space (i.e., axial separation) $d_{NP}$ (not shown) in relay optical system GL. In this manner, a retrofocus type configuration is formed, with lens group GLN serving as the front negative lens group and lens group GLP serving as the rear positive lens group. This configuration ensures a sufficient back focus. Also, since the height of the rays passing through the portion of lens 10 imagewise of aperture stop AS can be made large, the number of degrees of freedom for correcting aberrations increases.

In the close-up photographing lens of the present invention, relay optical system GL has positive refractive power and constitutes so-called reduction optical system, wherein the image-forming magnification is less than 1. Accordingly, relay optical system GL is a so-called wide converter. Typically, when a wide converter is employed in a single lens reflex camera, the amount of focusing movement is large when focusing on an object at close range. This is not desirable because the complexity of the mechanical construction increases. This is also true for such close-up cameras used for electronic imaging. However, since the lenses of cameras originally designed for electronic imaging (particularly those with compact image detector elements) are small, the amount of lens drive is minute. Consequently, there is an advantage in that, to a certain extent, the greater the amount of focusing movement, the easier the lens drive control becomes. Furthermore, as discussed above, since a wide converter is suited to an increased aperture size, a high degree of brightness (i.e., small F-number) can be obtained.

As mentioned above, it is preferable that the close-up photographing lens of the present invention satisfy at least one number of preferred design conditions. The first three conditions are expressed as:

$$0.25 < |\beta_{MOD}| \tag{1}$$

$$2.0 < BF/Y < 10.0 \tag{2}$$

$$0.02 < \Delta D12/BF < 3.0, \tag{3}$$

wherein $\beta_{MOD}$ is the photographic magnification in the most close-up focus state, BF is the back focus in the infinite focus state, Y is the maximum image height, and $\Delta D12$ is the change in the axial air space D12 when focusing from the infinite focus state to the most close-up focus state.

Condition (1) stipulates both the close-up focusing capability and the photographic magnification at the shortest practical phototaking distance of the close-up photographing lens of the present invention. Since the standard size film for 35 mm photography is 24×36 mm, there are cases where the lens cannot fill the entire image field with a minute object, even if a micro-lens or a macro-lens is used. However, by employing an electronic image detector having a smaller image field size, like a CCD, a more minute object can fill the entire image field. Consequently, in a practical sense, the enlargement ratio of an electronic camera is effectively larger than that of a conventional 35 mm film-based camera. To further enhance the effects of the present invention, it is preferable to set the lower limit value of condition (1) to 0.55 or greater.

Condition (2) stipulates the conditions to ensure a practical and adequately long back focus so the close-up photographing lens of the present invention is suitable for use with electronic imaging equipment. If BF/Y exceeds the upper limit value in condition (2), the overall lens length increases excessively, and the lens diameter of lens group GLP increases in size. Conversely, if BF/Y falls below the lower limit value in condition (2), the overall lens length decreases excessively, making it difficult to arrange filters, prisms and the like adjacent the image plane. Shading also tends to occur because it is difficult to obtain sufficient distance between the exit pupil and the image plane. To further enhance the effects of the present invention, it is preferable to set the upper limit value to 5.0 and the lower limit value to 3.0.

Condition (3) stipulates the condition for obtaining satisfactory imaging performance when focusing on an object at close range. The appropriate range for the amount of change in air space D12 when changing the focus state is indicated by the ratio of the change in the air space D12 to the back focus at infinity.

If $\Delta D12/BF$ exceeds the upper limit value in condition (3), the spacing increases excessively and the light beam passing through first lens group G1 widens. As a result, the lens diameter of first lens group G1 increases excessively. Furthermore, outward-oriented coma tends to be generated in the rays on the lower side of the principle ray, which is difficult correct. Conversely, if $\Delta D12/BF$ falls below the lower limit value in condition (3), there is a tendency for the difference between the best image point position at the image center when focusing on an object at close range and the best image point position at the periphery to increase. This makes it difficult to obtain satisfactory image quality over the entire image plane simultaneously. Furthermore, there is a tendency to upset the balance among the various aberrations. To further enhance the effects of the present invention, it is preferable to set the upper limit value to 1.0 and the lower limit value to 0.15.

In addition to the above conditions, it is preferable for the close-up photographing lens of the present invention to satisfy the following design condition:

$$1.0 < \Delta 1 \cdot |\beta_{MOD}|/Y < 10.0 \tag{4}$$

wherein $\Delta 1$ is the amount of movement of first lens group G1 from when focusing from the infinite focus state an object to the most close-up focus state, wherein the object-wise direction is taken as positive.

Condition (4) stipulates an appropriate amount of movement of first lens group G1 when changing focus from the infinite focus state to the most close-up focus state (i.e., the maximum photographic magnification $\beta_{MOD}$) with regard to the maximum image height. If $\Delta 1 \cdot |\beta_{MOD}|/Y$ exceeds the upper limit value in condition (4), the amount of movement of first lens group G1 increases excessively, inviting an increase in the overall length and diameter of the lens. In addition, fluctuations in various aberrations, starting with spherical aberration, increase when focusing at close range. Conversely, if $\Delta 1 \cdot |\beta_{MOD}|/Y$ falls below the lower limit value in condition (4), the composite focal length of first lens group G1 and second lens group G2 becomes excessively small, making it difficult to ensure an adequate working distance. Also, the Petzval sum tends to become excessively positive. To further enhance the effect of the present invention, it is preferable to set the upper limit value to 7.0 and the lower limit value to 4.0.

In addition, it is also preferable for the close-up photographing lens of the present invention to satisfy the design condition:

$$0.1 < d_{NP}/Y < 5.0 \tag{5}$$

wherein $d_{NP}$, as mentioned above, is the axial air space (i.e., axial separation, not shown in FIG. 1) between lens group GLN and lens group GLP.

Condition (5) stipulates an appropriate range for axial air space $d_{NP}$ between lens group GLN and lens group GLP with regard to the maximum image height. If $d_{NP}/Y$ exceeds the upper limit value in condition (5), axial air space $d_{NP}$ becomes excessively large and the light beam passing through lens group GLP widens. As a result, the lens diameter of lens group GLP increases excessively. In addition, distortion becomes excessively large and negative. Conversely, if $d_{NP}/Y$ falls below the lower limit value in condition (5), distortion tends to become excessively large and positive. Furthermore, shading tends to occur because of the difficulty of obtaining a sufficient distance between the exit pupil and the image plane. To further enhance the effects of the present invention, it is preferable to set the upper limit value to 1.0 or greater and the lower limit value to 0.2.

In a further embodiment of the present invention, it is preferred that lens group GLP have at least one positive lens and at least one negative lens. It is also preferred that aperture stop AS be provided between first lens group G1 and second lens group G2, and that lens group GLP have at least one cemented lens comprising a positive single lens and a negative single lens. In this embodiment, it is preferred that the following design condition be satisfied:

$$\nu_N < 30 \tag{6}$$

wherein, $\nu_N$ is the minimum Abbe number among the negative lenses in said lens group GLP.

Condition (6) stipulates the minimum Abbe number among the negative lenses in lens group GLP. If $\nu_N$ falls below the lower limit value in condition (6), the short wavelength axial chromatic aberration and lateral chromatic aberration tend to become positive, making it difficult to obtain satisfactory imaging performance.

In another embodiment of the present invention, it is preferred that second lens group G2 have a most imagewise positive meniscus lens (e.g., lens L22, FIG. 1) having an imagewise convex surface (i.e., wherein the imagewise surface has the strongest (i.e., smallest) radius of curvature).

The configuration of relay optical system GL is also important in obtaining superior imaging performance. To this end, it is preferable the close-up photographing lens of the present invention satisfy the following design condition:

$$0.2 < |fLN|/f < 5.0 \tag{7}$$

wherein fLN is the focal length of lens group GLN, and f is the overall focal length of close-up photographing lens 10.

Condition (7) sets forth an appropriate range for the ratio of focal length fLN to focal length f. If |fLN|/f exceeds the upper limit value in condition (7), fLN increases excessively and it becomes difficult to ensure a sufficient back focus. Conversely, if |fLN|/f falls below the lower limit value in condition (7), fLN becomes too small and the light beam passing through lens group GLN widens excessively. As a result, the lens diameter of lens group GLP increases excessively. In addition, the Petzval sum tends to become negative, and strong positive field curvature is generated, making it difficult to obtain satisfactory imaging performance. To further enhance the effects of the present invention, it is preferable to set the upper limit value to 1.5 and the lower limit value to 0.4.

To further increase the imaging performance of the close-up lens of the present invention, it is preferable to satisfy the following design condition pertaining to optical system GL:

$$0.2 < |fLN/fLP| < 4.0 \tag{8}$$

wherein fLP is the focal length of lens group GLP.

Condition (8) describes an appropriate range for the ratio of focal length fLN to focal length fLP. If |fLN/fLP| exceeds the upper limit value in condition (8), fLP increases excessively and distortion tends to become excessively positive. Also, outward-oriented coma tends to be generated in the rays on the upper side of the principle ray, which is difficult to correct. Conversely, if |fLN/fLP| falls below the lower limit value in condition (8), fLP becomes excessively small, making it difficult to ensure a sufficient back focus. In addition, the Petzval sum tends to become positive, and excess negative field curvature is generated, making it difficult to obtain satisfactory imaging performance. To flirther enhance the effects of the present invention, it is preferable to set the upper limit value to 2.0 and the lower limit value to 0.3.

To further increase the imaging performance of the close-up lens of the present invention, it is preferable to satisfy the following design condition pertaining to lens group GL:

$$0.2 < |fL/f| < 4.5 \tag{9}$$

wherein fL is the overall focal length of the lens group GL.

Condition (9) describes an appropriate range for the ratio of focal length fL of optical system GL, to overall focal length f of close-up photographing lens 10. If |fL/f| exceeds the upper limit value in condition (9), fL increases excessively and distortion tends to become positive. Furthermore, the magnification of optical system GL can no longer be made sufficiently large. Accordingly, the amount of movement of first lens group G1 and second lens group G2 when changing the focus from an object at infinity to an object at close range increases excessively. This makes the mechanical system for moving the lenses unduly complex. Conversely, if |fL/f| falls below the lower limit value in condition (9), fL becomes excessively small, making it difficult to ensure an adequate back focus. In addition, the Petzval sum tends to become positive, and excessive negative field curvature is generated, making it difficult to obtain satisfactory imaging performance. To further enhance the effects of the present invention, it is preferable to set the upper limit value to 2.0 and the lower limit value to 1.0.

In another embodiment of the close-up lens of the present invention, it is preferable to satisfy the following design condition:

$$1.5 < DL/DS < 3.0 \tag{10}$$

wherein DS is the diameter of aperture stop AS and DL is the effective diameter of the most imagewise surface of optical system GL (e.g., the imagewise surface of lens LP2 in FIG. 1).

Condition (10) stipulates an appropriate size for the light beam passing through the lens and is an important condition for obtaining both satisfactory imaging performance and a practical lens size. If DL/DS exceeds the upper limit value in condition (10), either the lens groups toward the rear of lens 10 (e.g., lens group GLP) become excessively large, or high-order coma and field curvature are generated, thereby precluding satisfactory imaging performance. Conversely, if DL/DS falls below the lower limit value in condition (10), ensuring an adequate back focus is difficult, and there is tendency for the exit pupil to approach the image plane, which reduces telecentricity. To further enhance the effects of the present invention, it is preferable to set the upper limit value to 2.0.

With continuing reference to FIG. 1, in a further embodiment of the close-up lens of the present invention, it is preferable that first lens group G1 include a negative meniscus lens whose front and rear surfaces are surrounded by air, and that lens group GLN include at least one negative lens and at least one positive lens. It is further preferable that lens group GLP comprise a cemented lens (e.g., lens LP1) comprising a negative single lens and a positive single lens, (e.g., LP1a and LP1b) with a divergent convex cemented surface therebetween facing objectwise, and a biconvex lens with two surfaces, the stronger of which is arranged objectwise. The configuration of the present embodiment is important for obtaining overall satisfactory imaging performance.

There are also several other preferred embodiments of the present invention. For instance, in first lens group G1, it is preferable to have a most objectwise positive lens with an objectwise convex surface (e.g., lens L11). Further, it is preferred that this most objectwise lens be a biconvex lens having an Abbe number $v_{11} \geq 4.0$. In addition, to correct various aberrations, starting with spherical aberration, it is preferred that the most imagewise lens of first lens group G1 be a negative meniscus lens with front and rear surfaces surrounded by air (e.g., lens L13). Also, to adequately correct coma of the rays on the upper side of the principle ray in second lens group G2, it is preferable to have the most imagewise lens of second lens group G2 be a positive meniscus lens having an imagewise convex surface (e.g., lens L22). Furthermore, it is preferable to arrange this positive meniscus lens imagewise of the cemented meniscus lens (e.g., lens L21) whose convex cemented surface faces imagewise.

With continuing reference to FIG. 1, the configuration of relay optical system GL is explained in greater detail. To satisfactorily correct chromatic aberration, as discussed above, it is preferable that lens group GLP have at least one positive lens and at least one negative lens. Specifically, it is preferable to have at least one cemented lens (e.g., lens LP1) comprising a positive single lens and a negative single lens (e.g., lenses LP1a and LP1b). Such a configuration is important for correcting lateral chromatic aberration. Further, it is preferred that the difference between the Abbe numbers of the glass material making up the positive lens and negative lens comprising the cemented lens be 2.0 or greater. The most imagewise position of lens group GLP in lens group GL is preferable for correcting lateral chromatic aberration.

To comprehensively correct not only chromatic aberration but also field curvature, astigmatism, coma and the like, it is preferable that cemented lens in lens group GLP have a divergent convex cemented surface facing objectwise, and a biconvex lens (e.g. LP2) whose surface with the strongest curvature is arranged objectwise. Such a divergent cemented surface is preferable because it facilitates ensuring an adequate back focus. In addition, it is desirable to arrange this divergent surface in the lens group having a positive refractive power, because it reduces the amount of aberration generated therein. Likewise, to ensure satisfactory imaging performance, it is preferable that lens group GLN have at least one positive lens and at least one negative lens. It is further preferable that lens group GLN have a cemented negative lens with a convergent cemented surface.

With continuing reference to FIG. 1, to further comprehensively correct aberrations including field curvature, astigmatism, coma and the like, it is preferable to arrange a biconcave lens (e.g., lens LN1) most objectwise in lens group GLN, and to arrange imagewise adjacent thereto a cemented negative lens (e.g., lens LN2) having a convergent cemented surface. Furthermore, it is preferable that the biconcave lens included in this cemented negative lens have a refractive index of 1.82 or greater with respect to the d-line ($\lambda$=587.56 nm). In addition, as discussed above, it is preferable that lens group GL be used with reduction magnification, and that the following condition be satisfied:

$$0.5 < \beta_{GL} < 1.0 \tag{11}$$

wherein $\beta_{GL}$ is the magnification of lens group GL. If $\beta_{GL}$ falls below the lower limit value in condition (11), it is difficult to ensure an adequate back focus BF. If $\beta_{GL}$ exceeds the upper limit value in condition (11), it becomes difficult to ensure brightness.

With continuing reference to FIG. 1, to further adequately correct aberrations and to obtain satisfactory imaging performance when focusing on an object at close range, it is preferable to adopt a configuration wherein first lens group G1 and second lens group G2 surround aperture stop AS, with the arrangement of refractive surfaces being nearly symmetrical. Specifically, it is preferable that the most imagewise surface of first lens group G1 be a divergent (concave) surface facing imagewise. Further, it is preferable that the most objectwise surface of second lens group G2 be a divergent (concave) surface facing objectwise.

To satisfactorily correct chromatic aberration when focusing at close range, first lens group G1 and second lens group G2, which move when focusing at close range, have a positive refractive power. It is important to satisfy the achromatic condition for each lens group, and it is important for each lens group to have at least one element having negative refractive power. Further, it is preferable to satisfy the condition $v_m < 35$, wherein $v_m$ is the minimum Abbe number of the negative lens elements in all the lens groups.

To reduce the Petzval sum of close-up photographing lens 10 to an appropriate value, it is preferable to set the minimum refractive index among the positive lens elements in first lens group G1 and second lens group G2 to $n_p \geq 1.65$. To ensure a satisfactory aberration balance between spherical aberration and coma, it is preferable that the air lens between the objectwise lens surface of the negative lens most imagewise of first lens group G1 and the lens surface adjacent objectwise thereto (e.g., the air space between lens elements L12 and L13) be meniscus shaped with an objectwise convex surface.

To further increase the imaging performance of the close-up lens of the present invention, the refractive power between first lens group G1 and second lens group G2 must be properly distributed. To this end, it is preferable that the following condition be satisfied:

$$1.5 < f1/f2 < 3.0 \tag{12}$$

wherein the f1 and f2 are the focal lengths of first lens group G1 and second lens group, respectively. In addition, satisfactory imaging performance is obtained when focusing at close range, even if lens groups GLN and GLP in relay optical system GL are left in a fixed position. Furthermore, a mode in which first lens group G1 and second lens group G2 move together is also acceptable. Consequently, better optical performance is obtained.

As the photographic magnification of the close-up lens of the present invention grows larger, it is easy for the focus to deviate, since the depth of field narrows. However, this problem can be prevented by incorporating an autofocus system.

So-called antivibration can also be achieved by shifting or tilting relay optical system GL, or lens group GLN or GLP therein, with respect to the optical axis. In particular, it is preferable to make lens group GLN the antivibration lens group. Likewise, swing-and-tilt photography is also possible by shifting and tilting the lens. Increased imaging performance is obtained if aspherical lenses, gradient index lenses, and diffraction optical elements and the like are used as one or more of the lenses comprising the present invention.

WORKING EXAMPLES

In Tables 1A and 2A, below, set forth the design specifications of Working Examples 1 and 2, respectively. Both Working Examples are particularly well-suited for use with electronic imaging equipment. In Tables 1A and 2A, S is the number of the lens surface from the object side, r is the radius of curvature, d is the surface spacing, ν is the Abbe number, n(d) is the refractive index with respect to the d-line (λ=587.56 nm), and n(g) is the refractive index with respect to the g-line (λ=435.84 nm).

Working Example 1

With reference to FIG. 1, close-up photographing lens 10 according to Working Example 1 comprises, objectwise to imagewise, first lens group G1 having positive refractive power, second lens group G2 having positive refractive power and relay optical system GL having positive refractive power. First lens group G1 and second lens group G2 move objectwise on different trajectories (as indicated by arrows 16 and 18) when changing the focus from an infinite-distance object to a close-range object. Axial air space D12 between first lens group G1 and second lens group G2 is more narrow in the most close-up focus state than in the infinite focus state.

First lens group G1 includes, objectwise to imagewise, a biconvex lens L11, a positive meniscus lens L12 having an objectwise convex surface, and a negative meniscus lens L13 having an objectwise convex surface and whose front and rear surfaces are surrounded by air.

Second lens group G2 includes, objectwise to imagewise, a positive cemented lens L21 comprising a biconcave lens L21a and a biconvex lens L21b, with a divergent convex surface therebetween facing objectwise, and a positive meniscus lens L22 having an imagewise convex surface. An aperture stop AS is provided between first lens group G1 and second lens group G2.

In addition, relay optical system GL includes a lens group GLN (i.e., a third lens group) having negative refractive power and a lens group GLP (i.e., a fourth lens group) having positive refractive power. Lens group GLN includes at least one negative lens and at least one positive lens, and preferably comprises, objectwise to imagewise, a biconvex lens LN1, and a cemented negative lens LN2 comprising a biconcave lens LN2a and a positive meniscus lens LN2b, with a divergent convex surface therebetween facing objectwise.

Positive lens group GLP comprises a cemented lens LP1 comprising a negative single lens LP1a and positive single lens LP1b with a divergent convex cemented surface therebetween facing objectwise, and a biconvex lens LP2 whose stronger curved surface is arranged objectwise. Lens groups GLN and GLP surround the largest air space $d_{NP}$ in relay optical system GL (i.e., the air space between lenses LN2b and LP1a.).

The present Working Example includes a completely imagewise telecentric state in the interval from the infinite distance focus state to the intermediate photographic magnification state.

Tables 1A–1D, below, sets forth the specifications, parameters, and conditions for Working Example 1.

TABLE 1A

DESIGN SPECIFICATIONS
focal length = 18.5 mm
F-number = 2.06
maximum image height = 4 mm
magnification = ∞~–½×~–1×

| S | r | d | ν | n(d) | n(g) |
|---|---|---|---|---|---|
|  |  | d0 |  | 1.000000 | 1.000000 |
| 1 | 25.8971 | 1.0200 | 43.93 | 1.785900 | 1.808460 |
| 2 | –367.6468 | 0.9800 |  | 1.000000 | 1.000000 |
| 3 | 10.1979 | 1.1000 | 43.93 | 1.785900 | 1.808460 |
| 4 | 10.2311 | 0.7900 |  | 1.000000 | 1.000000 |
| 5 | 9.3087 | 1.0600 | 23.83 | 1.846660 | 1.893900 |
| 6 | 6.8374 | d6 |  | 1.000000 | 1.000000 |
| 7 | (AS) | 1.2000 |  | 1.000000 | 1.000000 |
| 8 | –7.0009 | 1.2000 | 30.05 | 1.698950 | 1.729410 |
| 9 | 29.0449 | 1.7400 | 40.73 | 1.806100 | 1.831270 |
| 10 | –11.9486 | 0.1000 |  | 1.000000 | 1.000000 |
| 11 | –1929.2922 | 1.1500 | 43.93 | 1.785900 | 1.808460 |
| 12 | –14.5691 | d12 |  | 1.000000 | 1.000000 |
| 13 | –38.3183 | 1.0000 | 58.44 | 1.651600 | 1.665380 |
| 14 | 129.8027 | 0.5500 |  | 1.000000 | 1.000000 |
| 15 | –17.8477 | 1.0000 | 49.61 | 1.772500 | 1.791920 |
| 16 | 28.0000 | 1.1000 | 23.83 | 1.846660 | 1.893900 |
| 17 | 31.7811 | 1.0000 |  | 1.000000 | 1.000000 |
| 18 | –63.1429 | 1.0000 | 23.83 | 1.846660 | 1.893900 |
| 19 | 29.1006 | 2.4000 | 43.93 | 1.785900 | 1.808460 |
| 20 | –13.9472 | 0.1000 |  | 1.000000 | 1.000000 |
| 21 | 18.7845 | 2.1600 | 55.48 | 1.696800 | 1.712350 |
| 22 | –48.3390 |  |  | 1.000000 | 1.000000 |

TABLE 1B

SPACINGS

|  | 1-POS | 2-POS (–½×) | 3-POS (–1×) |
|---|---|---|---|
| d0 | ∞ | 47.5203 | 29.7697 |
| d6 | 4.58720 | 2.53692 | 2.39567 |
| d12 | 0.12323 | 13.43017 | 26.38398 |

TABLE 1C

DESIGN PARAMETER VALUES

| PARAMETER | VALUE |
|---|---|
| $\beta_{MOD}$ | –1.0 |
| BF | 13.947 |
| Y | 4.0 |
| ΔD12 | 2.192 |
| $d_{NP}$ | 1.0 |
| $\nu_N$ | 23.83 |
| Δ1 | 24.069 |
| f | 18.5 |
| fLN | –10.780 |
| fLP | 10.674 |
| fL | 25.406 |
| f1 | 56.306 |
| f2 | 21.96 |
| $\beta_{GL}$ | 0.828 |
| DS | 6.4 |
| DL | 10.71 |

TABLE 1D

DESIGN CONDITION VALUES

| DESIGN CONDITION | VALUE |
|---|---|
| (1) $|\beta_{MOD}|$ | 1.0 |
| (2) BF/Y | 3.487 |
| (3) $\Delta D12/BF$ | 0.157 |
| (4) $\Delta 1 \cdot |\beta_{MOD}|/Y$ | 6.017 |
| (5) d/Y | 0.25 |
| (6) $v_N$ | 23.83 |
| (7) $|fLN|/f$ | 0.5827 |
| (8) $|fLN/FLP|$ | 1.010 |
| (9) $|FL/f|$ | 1.373 |
| (10) $|DL/DS|$ | 1.673 |

FIGS. 2A–2E to FIGS. 4A–4E show aberration plots of Working Example 1 when focusing on an object at infinity, at $-\frac{1}{2}\times$ and at $-1\times$, respectively. In each aberration plot, FNO is the F-number, A is the field angle, Y is the image height, d is the d-line ($\lambda$=587.6 nm), and g is the g-line ($\lambda$=435.8 nm), respectively. In addition, the solid lines in the aberration plots for astigmatism (FIGS. 2B–4B) indicate the sagittal image plane, and the broken lines indicate the meridional image plane.

As can be seen from the aberration plots, the various aberrations in the present Working Example are satisfactorily corrected.

Working Example 2

Figure 5:
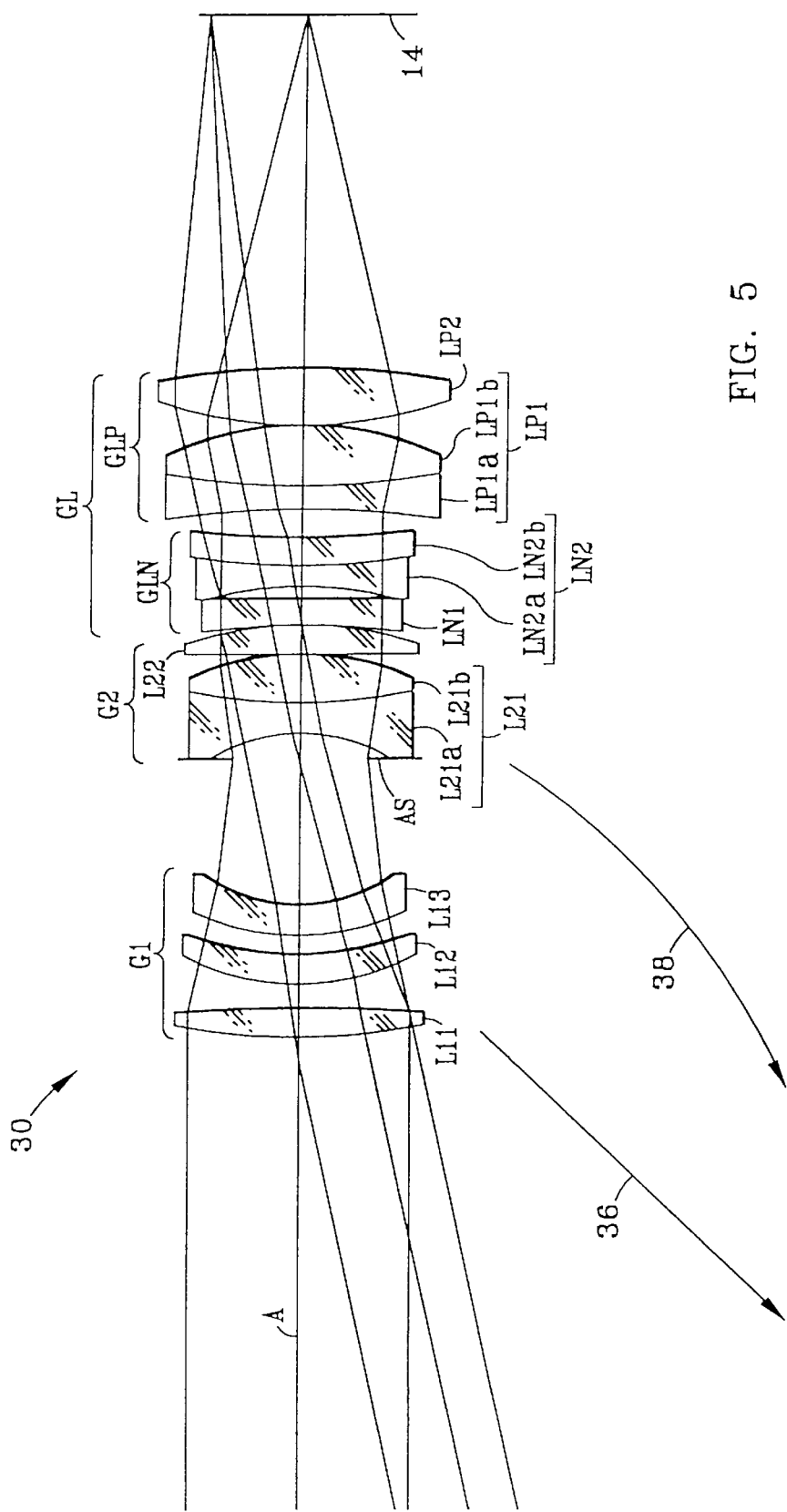
FIG. 5 is a schematic optical diagram of Working Example 2 of the present invention.

With reference to FIG. 5, lens 30 according to Working Example 2 comprises, objectwise to imagewise, the same type of elements as in lens 10 of FIG. 1. The trajectories for first lens group G1 and second lens group G2 during focusing are indicated by arrows 36 and 38.

Tables 2A–2D, below, sets forth the specifications, parameters, and conditions for Working Example 2.

TABLE 2A

DESIGN SPECIFICATIONS
focal length = 13.875 mm
F-number = 2.06
maximum image height = 3 mm
magnification = $\infty \sim -\frac{1}{2}\times \sim -1\times$

| S | r | d | v | n(d) | n(g) |
|---|---|---|---|---|---|
|  |  | d0 |  | 1.000000 | 1.000000 |
| 1 | 17.9194 | 0.7650 | 49.61 | 1.772500 | 1.791920 |
| 2 | −609.8928 | 0.7350 |  | 1.000000 | 1.000000 |
| 3 | 7.1776 | 0.8250 | 49.61 | 1.772500 | 1.791920 |
| 4 | 7.0257 | 0.5925 |  | 1.000000 | 1.000000 |
| 5 | 6.3855 | 0.7950 | 23.83 | 1.846660 | 1.893900 |
| 6 | 4.8104 | d6 |  | 1.000000 | 1.000000 |
| 7 | (AS) | 1.2000 |  | 1.000000 | 1.000000 |
| 8 | −5.3512 | 0.9000 | 30.05 | 1.698950 | 1.729410 |
| 9 | 17.4473 | 1.4000 | 4073 | 1.806100 | 1.831270 |
| 10 | −8.9946 | 0.0750 |  | 1.000000 | 1.000000 |
| 11 | 22.60368 | 0.9000 | 49.61 | 1.772500 | 1.791920 |
| 12 | −11.4182 | d12 |  | 1.000000 | 1.000000 |
| 13 | −32.1500 | 0.5000 | 58.44 | 1.651600 | 1.665380 |
| 14 | 23.9761 | 0.5000 |  | 1.000000 | 1.000000 |
| 15 | −13.3858 | 0.5000 | 50.35 | 1.720000 | 1.737850 |
| 16 | 21.0000 | 0.7000 | 23.83 | 1.846660 | 1.893900 |
| 17 | 23.8358 | 0.7500 |  | 1.000000 | 1.000000 |
| 18 | −152.5408 | 0.7500 | 23.83 | 1.846660 | 1.893900 |
| 19 | 18.0503 | 1.8000 | 43.93 | 1.785900 | 1.808460 |
| 20 | −10.4551 | 0.0750 |  | 1.000000 | 1.000000 |
| 21 | 12.7879 | 1.6200 | 53.93 | 1.713000 | 1.729390 |
| 22 | −65.1968 |  |  | 1.000000 | 1.000000 |

TABLE 2B

SPACINGS

|  | 1-POS | 2-POS ($-\frac{1}{2}\times$) | 3-POS ($-1\times$) |
|---|---|---|---|
| d0 | $\infty$ | 34.6955 | 21.5388 |
| d6 | 3.35064 | 1.78035 | 1.51596 |
| d12 | 0.25316 | 9.67493 | 18.76677 |

TABLE 2C

DESIGN PARAMETER VALUES

| PARAMETER | VALUE |
|---|---|
| $\beta_{MOD}$ | −1.0 |
| BF | 9.883 |
| Y | 3.0 |
| $\Delta D12$ | 1.835 |
| $d_{NP}$ | 0.75 |
| $v_N$ | 23.83 |
| $\Delta 1$ | 16.679 |
| f | 13.875 |
| fLN | −7.376 |
| fLP | 7.523 |
| fL | 19.054 |
| f1 | 40.000 |
| f2 | 15.660 |
| $\beta_{GL}$ | 0.852 |
| DS | 4.8 |
| DL | 7.78 |

TABLE 2D

DESIGN CONDITION VALUES

| DESIGN CONDITION | VALUE |
|---|---|
| (1) $|\beta_{MOD}|$ | 1.0 |
| (2) BF/Y | 3.294 |
| (3) $\Delta D12/BF$ | 0.186 |
| (4) $\Delta 1 \cdot |\beta_{MOD}|/Y$ | 5.560 |
| (5) $d_{NP}/Y$ | 0.25 |
| (6) $v_N$ | 23.83 |
| (7) $|fLN|/f$ | 0.5316 |
| (8) $|fLN/FLP|$ | 0.980 |
| (9) $|FL/f|$ | 1.373 |
| (10) $|DL/DS|$ | 1.621 |

FIGS. 6A–6E to FIGS. 8A–8E show aberration plots of Working Example 2 when focusing on an object at infinity, at $-\frac{1}{2}\times$ and at $-1\times$, respectively. These aberration plots utilize the same variables and format as the plots shown in FIGS. 2A–2D to FIGS. 4A–4D for Working Example 2.

As can be seen from the aberration plots, the various aberrations in the present Working Example are satisfactorily corrected.

According to the present invention, a close-up photographing lens having a long back focus, high performance, and sufficient telecentricity at a large aperture can be provided, such lens being ideally suited to electronic imaging equipment and the like.

While the present invention has been described in connection with various embodiments and Working Examples, it will be understood that it is not so limited. On the contrary, it is intended to cover all alternatives, modifications, and equivalents as may be included within the spirit and scope of the invention as defined in the appended claims.

What is claimed is:

1. A close-up photographing lens capable of forming an image of an object and changing focus from an infinite focus state to a most close-up focus state, comprising, objectwise to imagewise along an optical axis:

a) a first lens group having positive refractive power;

b) a second lens group having positive refractive power and axially separated from said first lens group by an air space D12;

c) an aperture stop between said first lens group and said second lens group;

d) a relay optical system having positive refractive power, wherein said relay optical system includes a third lens group having negative refractive power and a fourth lens group having positive refractive power, said fourth lens group including at least one positive lens and at least one negative lens, wherein said third and fourth lens groups are axially separated by an air space $d_{NP}$ and the following condition is satisfied: $0.1 < d_{NP}/Y < 5.0$, further wherein said fourth lens group has at least one cemented lens comprising a positive single lens and a negative single lens and the following condition is satisfied: $v_N < 30$ wherein, $v_N$ is a minimum Abbe number for the negative lenses in said fourth lens group;

e) wherein the correction lens is designed such that, when changing focus from the infinite focus state to the most close-up focus state, said first lens group and said second lens group move objectwise on different trajectories, and said air space D12 is narrower when in the most close-up focus state than when in the infinite focus state;

f) wherein the following conditions are satisfied $$0.25 < |\beta_{MOD}|$$

$$2.0 < BF/Y < 10.0$$

$$0.02 < \Delta D12/BF < 3.0$$

wherein $\beta_{MOD}$ is a photographic magnification in the most close-up focus state, BF is a back focus in the infinite focus state, Y is a maximum height of the image, and $\Delta D12$ is a change in said air space D12 when focusing from the infinite focus state to the most close-up focus state; and g) further wherein the following condition is satisfied:

$$1.0 < \Delta 1 \cdot |\beta_{MOD}|/Y < 10.0$$

wherein $\Delta 1$ is an amount of movement of said first lens group when focusing from the infinite focus state to the most close-up focus state, said amount of movement $\Delta 1$ having a positive sign when said first lens group moves objectwise.

2. A close-up photographing lens according to claim 1, wherein said second lens group includes a most imagewise positive meniscus lens having an imagewise convex surface.

3. A close-up photographing lens according to claim 2, wherein:

a) said first lens group includes a negative meniscus lens having a front surface and a rear surface, with air adjacent said front surface and said rear surface;

b) said third lens group includes at least one negative lens and at least one positive lens; and c) said fourth lens group includes a divergent convex cemented surface between said positive single lens and said negative single lens and facing objectwise, and a biconvex lens having a weaker curvature surface and a stronger curvature surface, with said stronger curvature surface arranged objectwise.

4. A close-up photographing lens capable of forming an image of an object and changing focus from an infinite focus state to a most close-up focus state, comprising objectwise to imagewise along an optical axis:

a) a first lens group having positive refractive power;

b) a second lens group having positive refractive power and axially separated from said first lens group by an air space D12, wherein said second lens group includes a most imagewise positive meniscus lens having an imagewise convex surface;

c) a relay optical system having positive refractive power, wherein said relay optical system includes a third lens group having negative refractive power, and a fourth lens group having positive refractive power, said fourth lens group including at least one positive lens and at least one negative lens, wherein said third and fourth lens groups are axially separated by an air space $d_{NP}$ and the following condition is satisfied: $0.1 < d_{NP}/Y < 5.0$;

d) wherein the correction lens is designed such that, when changing focus from the infinite focus state to the most close-up focus state, said first lens group and said second lens group move objectwise on different trajectories, and said air space D12 is narrower when in the most close-up focus state than when in the infinite focus state; and e) wherein the following conditions are satisfied:

$$0.25 < |\beta_{MOD}|$$

$$2.0 < BF/Y < 10.0$$

$$0.02 < \Delta D12/BF < 3.0$$

wherein $\beta_{MOD}$ is a photographic magnification in the most close-up focus state, BF is a back focus in the infinite focus state, Y is a maximum height of the image, and $\Delta D12$ is a change in said air space D12 when focusing from the infinite focus state to the most close-up focus state; and f) further wherein the following condition is satisfied:

$$1.0 < \Delta 1 \cdot |\beta_{MOD}|/Y < 10.0$$

wherein $\Delta 1$ is an amount of movement of said first lens group when focusing from the infinite focus state to the most close-up focus state, said amount of movement $\Delta 1$ having a positive sign when said first lens group moves objectwise.

5. A close-up photographing lens capable of forming an image of an object and changing focus from an infinite focus state to a most close-up focus state, comprising, objectwise to imagewise along an optical axis:

a) a first lens group having positive refractive power, wherein said first lens group has a negative meniscus lens having a front surface and a rear surface, with air adjacent said front surface and said rear surface;

b) a second lens group having positive refractive power and axially separated from said first lens group by an air space D12;

c) a relay optical system having positive refractive power, wherein said relay optical system includes a third lens group having negative refractive power and at least one negative lens and at least one positive lens, and a fourth lens group having positive refractive power, said fourth lens group including at least one positive lens and at least one negative lens, wherein said third and fourth lens groups are axially separated by an air space $d_{NP}$ and the following condition is satisfied: $0.1 < d_{NP}/Y < 5.0$, said fourth lens group further including a cemented lens comprising a positive single lens and a negative single lens and having a divergent convex cemented surface therebetween facing objectwise, and a biconvex lens having a weaker curvature surface and a stronger curvature surface, with said stronger curvature surface arranged objectwise;

d) wherein the correction lens is designed such that, when changing focus from the infinite focus state to the most close-up focus state, said first lens group and said second lens group move objectwise on different trajectories, and said air space D12 is narrower when in the most close-up focus state than when in the infinite focus state; and e) wherein the following conditions are satisfied $0.25 < |\beta_{MOD}|$ $2.0 < BF/Y < 10.0$ $0.02 < \Delta D12/BF < 3.0$ wherein $\beta_{MOD}$ is a photographic magnification in the most close-up focus state, BF is a back focus in the infinite focus state, Y is a maximum height of the image, and $\Delta D12$ is a change in said air space D12 when focusing from the infinite focus state to the most close-up focus state; and f) further wherein the following condition is satisfied:

$1.0 < \Delta 1 \cdot |\beta_{MOD}|/Y < 10.0$ wherein $\Delta 1$ is an amount of movement of said first lens group when focusing from the infinite focus state to the most close-up focus state, said amount of movement $\Delta 1$ having a positive sign when said first lens group moves objectwise.

6. A close-up photographing lens capable of forming an image of an object and changing focus from an infinite focus state to a most close-up focus state, comprising, objectwise to imagewise along an optical axis:

a) a first lens group having positive refractive power;

b) a second lens group having positive refractive power and axially separated from said first lens group by an air space D12:

c) an aperture stop between said first lens group and said second lens group;

d) a relay optical system having positive refractive power, wherein said relay optical system includes a fourth lens group having positive refractive power and at least one cemented lens comprising a positive single lens and a negative single lens, further wherein the following condition is satisfied: $v_N < 30$ wherein, $v_N$ is a minimum Abbe number for the negative lenses in said lens fourth lens group;

e) wherein the correction lens is designed such that, when changing focus from the infinite focus state to the most close-up focus state, said first lens group and said second lens group move objectwise on different trajectories, and said air space D12 is narrower when in the most close-up focus state than when in the infinite focus state;

f) wherein the following conditions are satisfied $0.25 < |\beta_{MOD}|$ $2.0 < BF/Y < 10.0$ $0.02 < \Delta D12/BF < 3.0$ wherein $\beta_{MOD}$ is a photographic magnification in the most close-up focus state, BF is a back focus in the infinite focus state, Y is a maximum height of the image, and $\Delta D12$ is a change in said air space D12 when focusing from the infinite focus state to the most close-up focus state; and g) further wherein the following condition is satisfied:

$1.0 < \Delta 1 \cdot |\beta_{MOD}|/Y < 10.0$ wherein $\Delta 1$ is an amount of movement of said first lens group when focusing from the infinite focus state to the most close-up focus state, said amount of movement $\Delta 1$ having a positive sign when said first lens group moves objectwise.

7. A close-up photographing lens capable of forming an image of an object and changing focus from an infinite focus state to a most close-up focus state, comprising, objectwise to imagewise along an optical axis:

a) a first lens group having positive refractive power;

b) a second lens group having positive refractive power and axially separated from said first lens group by an air space D12, wherein said second lens group includes a most imagewise positive meniscus lens having an imagewise convex surface;

c) a relay optical system having positive refractive power;

d) wherein the correction lens is designed such that, when changing focus from the infinite focus state to the most close-up focus state, said first lens group and said second lens group move objectwise on different trajectories, and said air space D12 is narrower when in the most close-up focus state than when in the infinite focus state;

f) wherein the following conditions are satisfied $0.25 < |\beta_{MOD}|$ $2.0 < BF/Y < 10.0$ $0.02 < \Delta D12/BF < 3.0$ wherein $\beta_{MOD}$ is a photographic magnification in the most close-up focus state, BF is a back focus in the infinite focus state, Y is a maximum height of the image, and $\Delta D12$ is a change in said air space D12 when focusing from the infinite focus state to the most close-up focus state; and g) further wherein the following condition is satisfied:

$1.0 < \Delta 1 \cdot |\beta_{MOD}|/Y < 10.0$ wherein $\Delta 1$ is an amount of movement of said first lens group when focusing from the infinite focus state to the most close-up focus state, said amount of movement $\Delta 1$ having a positive sign when said first lens group moves objectwise.

8. A close-up photographing lens capable of forming an image of an object and changing focus from an infinite focus state to a most close-up focus state, comprising, objectwise to imagewise along an optical axis:

19 a) a first lens group having positive refractive power, wherein said first lens group has a negative meniscus lens having a front surface and a rear surface, with air adjacent said front surface and said rear surface;
b) a second lens group having positive refractive power and axially separated from said first lens group by an air space D12;
c) a relay optical system having positive refractive power, wherein said relay optical system includes a third lens group having negative refractive power, said third lens group having at least one negative lens and at least one positive lens, further wherein said relay optical system includes a fourth lens group having positive refractive power, said fourth lens group having a cemented lens comprising a positive single lens and a negative single lens and having a divergent convex cemented surface therebetween facing objectwise, and a biconvex lens having a weaker curvature surface and a stronger curvature surface, with said stronger curvature surface arranged objectwise;
d) wherein the correction lens is designed such that, when changing focus from the infinite focus state to the most close-up focus state, said first lens group and said second lens group move objectwise on different trajectories, and said air space D12 is narrower when in the most close-up focus state than when in the infinite focus state;
e) wherein the following conditions are satisfied $0.25 < |\beta_{MOD}|$ $2.0 < BF/Y < 10.0$ $0.02 < \Delta D12/BF < 3.0$ wherein $\beta_{MOD}$ is a photographic magnification in the most close-up focus state, BF is a back focus in the infinite focus state, Y is a maximum height of the image, and $\Delta D12$ is a change in said air space D12 when focusing from the infinite focus state to the most close-up focus state;
f) further wherein the following condition is satisfied:

$1.0 < \Delta 1 \cdot |\beta_{MOD}|/Y < 10.0$ wherein $\Delta 1$ is an amount of movement of said first lens group when focusing from the infinite focus state to the most close-up focus state, said amount of movement $\Delta 1$ having a positive sign when said first lens group moves objectwise.

9. A close-up photographing lens capable of forming an image of an object and changing focus from an infinite focus state to a most close-up focus state, comprising, objectwise to imagewise along an optical axis:

a) a first lens group having positive refractive power;
b) a second lens group having positive refractive power and axially separated from said first lens group by an air space D12;
c) an aperture stop between said first lens group and said second lens group;
a relay optical system having positive refractive power, wherein said relay optical system includes a third lens group having negative refractive power and a fourth lens group having positive refractive power, said third and fourth lens groups being axially separated by an air space $d_{NP}$ and wherein the following condition is satisfied:

20

$0.1 < d_{NP}/Y < 5.0$, further wherein said fourth lens group has at least one cemented lens comprising a positive single lens and a negative single lens and the following condition is satisfied:

$v_N < 30$ wherein, $v_N$ is a minimum Abbe number for the negative lenses in said lens fourth lens group;
e) wherein the correction lens is designed such that, when changing focus from the infinite focus state to the most close-up focus state, said first lens group and said second lens group move objectwise on different trajectories, and said air space D12 is narrower when in the most close-up focus state than when in the infinite focus state; and
f) wherein the following conditions are satisfied $0.25 < |\beta_{MOD}|$    (1)

$2.0 < BF/Y < 10.0$    (2)

$0.02 < \Delta D12/BF < 3.0$    (3)

wherein $\beta_{MOD}$ is a photographic magnification in the most close-up focus state, BF is a back focus in the infinite focus state, Y is a maximum height of the image, and $\Delta D12$ is a change in said air space D12 when focusing from the infinite focus state to the most close-up focus state.

10. A close-up photographing lens capable of forming an image of an object and changing focus from an infinite focus state to a most close-up focus state, comprising, objectwise to imagewise along an optical axis:

a) a first lens group having positive refractive power;
b) a second lens group having positive refractive power and axially separated from said first lens group by an air space D12, wherein said second lens group includes a most imagewise positive meniscus lens having an imagewise convex surfaces;
c) a relay optical system having positive refractive power;
d) wherein the correction lens is designed such that, when changing focus from the infinite focus state to the most close-up focus state, said first lens group and said second lens group move objectwise on different trajectories, and said air space D12 is narrower when in the most close-up focus state than when in the infinite focus state; and
e) wherein the following conditions are satisfied $0.25 < |\beta_{MOD}|$ $2.0 < BF/Y < 10.0$ $0.02 < \Delta D12/BF < 3.0$ wherein $\beta_{MOD}$ is a photographic magnification in the most close-up focus state, BF is a back focus in the infinite focus state, Y is a maximum height of the image, and $\Delta D12$ is a change in said air space D12 when focusing from the infinite focus state to the most close-up focus state.

11. A close-up photographing lens capable of forming an image of an object and changing focus from an infinite focus state to a most close-up focus state, comprising, objectwise to imagewise along an optical axis:

a) a first lens group having positive refractive power, wherein said first lens group has a negative meniscus lens having a front surface and a rear surface, with air adjacent said front surface and said rear surface;

b) a second lens group having positive refractive power and axially separated from said first lens group by an air space D12;

c) a relay optical system having positive refractive power, wherein said relay optical system includes a third lens group having negative refractive power and a fourth lens group having positive refractive power, said third and fourth lens groups being axially separated by an air space $d_{NP}$ and wherein the following condition is satisfied: $0.1 < d_{NP}/Y < 5.0$, further wherein said third lens group has at least one negative lens and at least one positive lens and said fourth lens group includes a cemented lens comprising a positive single lens and a negative single lens and having a divergent convex cemented surface there between facing objectwise, and a biconvex lens having a weaker curvature surface and a stronger curvature surface, with said stronger curvature surface arranged objectwise;

d) wherein the correction lens is designed such that, when changing focus from the infinite focus state to the most close-up focus state, said first lens group and said second lens group move objectwise on different trajectories, and said air space D12 is narrower when in the most close-up focus state than when in the infinite focus state; and e) wherein the followings conditions are satisfied $0.25 < |\beta_{MOD}|$ $2.0 < BF/Y < 10.0$ $0.02 < \Delta D12/BF < 3.0$ wherein $\beta_{MOD}$ is a photographic magnification in the most close-up focus state, BF is a back focus in the infinite focus state, Y is a maximum height of the image, and $\Delta D12$ is a change in said air space D12 when focusing from the infinite focus state to the most close-up focus state.

* * * * *